(12) United States Patent
Willis

(10) Patent No.: US 9,638,525 B1
(45) Date of Patent: May 2, 2017

(54) SYSTEMS AND METHODS FOR MONITORING POSITIONING OF A MACHINE BY UTILIZING A VIRTUAL IMU

(71) Applicant: Caterpillar Inc., Peoria, IL (US)

(72) Inventor: Frank Willis, Canton, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/987,018

(22) Filed: Jan. 4, 2016

(51) Int. Cl.
*G01C 21/10* (2006.01)
*G01C 21/16* (2006.01)
*B62D 53/00* (2006.01)
*G01C 21/12* (2006.01)
*G01C 21/18* (2006.01)
*B60P 1/04* (2006.01)

(52) U.S. Cl.
CPC ........... *G01C 21/16* (2013.01); *B62D 53/005* (2013.01); *G01C 21/10* (2013.01); *G01C 21/12* (2013.01); *G01C 21/18* (2013.01); *B60P 1/04* (2013.01); *G01C 21/165* (2013.01)

(58) Field of Classification Search
None
See application file for complete search history.

(56) References Cited

U.S. PATENT DOCUMENTS

| | | | |
|---|---|---|---|
| 6,831,599 B2 | 12/2004 | Morgan | |
| 7,477,973 B2 * | 1/2009 | Brewer | A01B 69/008 701/41 |
| 8,442,703 B2 | 5/2013 | Petillon | |
| 8,795,078 B1 * | 8/2014 | Musick, Jr. | G06F 3/0346 463/37 |
| 8,886,490 B2 | 11/2014 | Baek | |
| 9,026,263 B2 * | 5/2015 | Hoshizaki | G01C 21/165 701/1 |
| 2010/0256907 A1 | 10/2010 | Bye | |
| 2014/0168009 A1 * | 6/2014 | Peake | E02F 9/264 342/357.34 |
| 2014/0207331 A1 | 7/2014 | Zhdanov | |

* cited by examiner

*Primary Examiner* — Redhwan K Mawari
*Assistant Examiner* — Edward Torchinsky
(74) *Attorney, Agent, or Firm* — Miller, Matthias & Hull

(57) ABSTRACT

A system for monitoring positioning of a machine is disclosed. The system includes an IMU located at a first location on the machine and configured to generate positioning data associated with the first location. The system includes a machine controller operatively associated with the machine. The machine controller is configured to determine predicted positioning data for a second location on the machine based on positioning data associated with the first location. The machine controller is further configured to generate a virtual IMU at the second location based on the predicted positioning data for the second location, wherein the virtual IMU generates virtual positioning data for the second location. The system further includes an application controller operatively associated with the machine controller and configured to use the virtual positioning data as input data for one or more machine-associated applications.

20 Claims, 5 Drawing Sheets

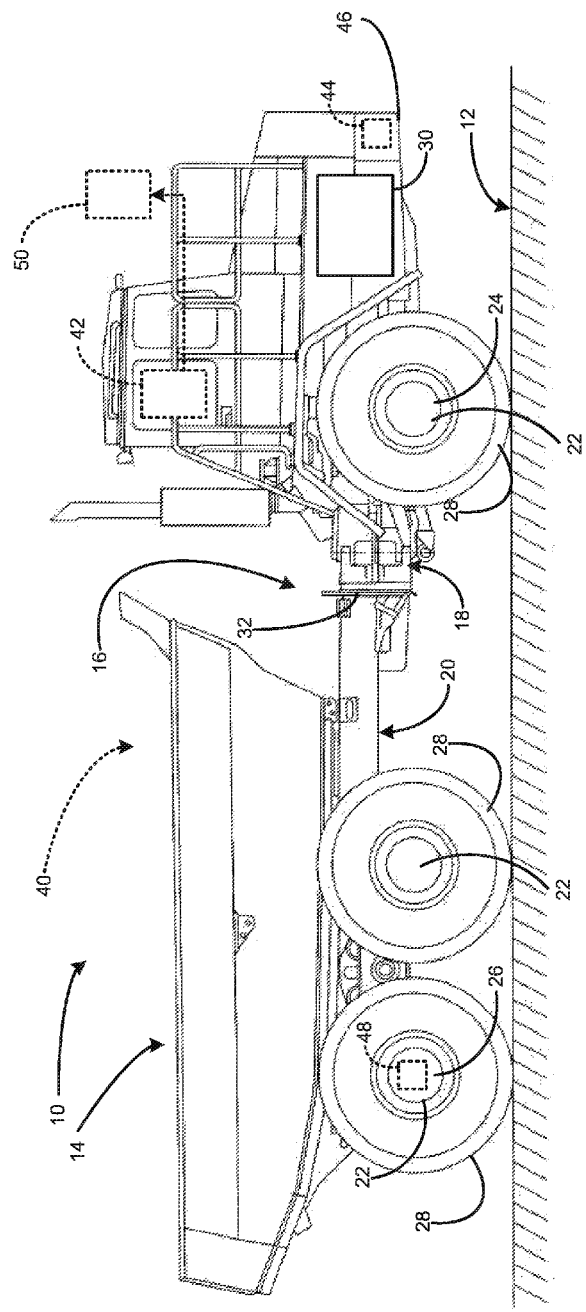
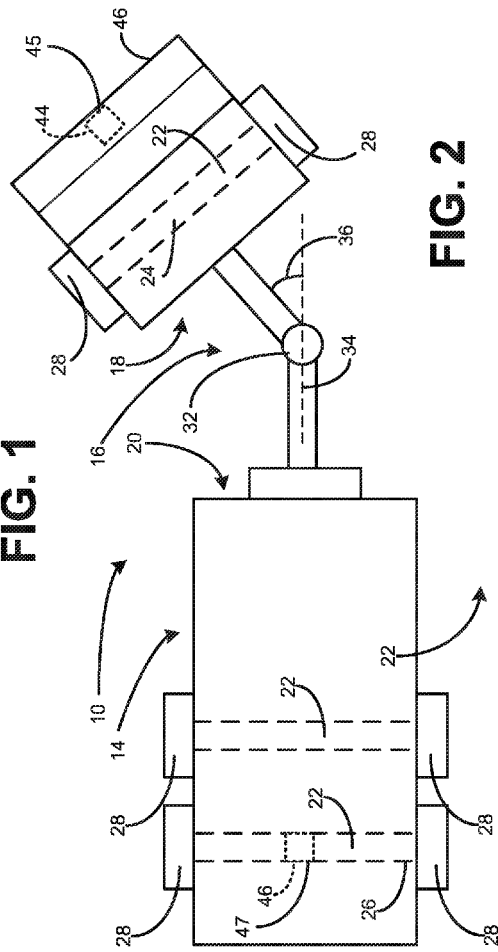
FIG. 1
FIG. 2

$$A_{47R} = A_{45R} + [G_R \times L_R]$$

$$G_A = G_{45} + dG$$
$$A_{47A} = A_{45A} + [G_A \times L_A]$$

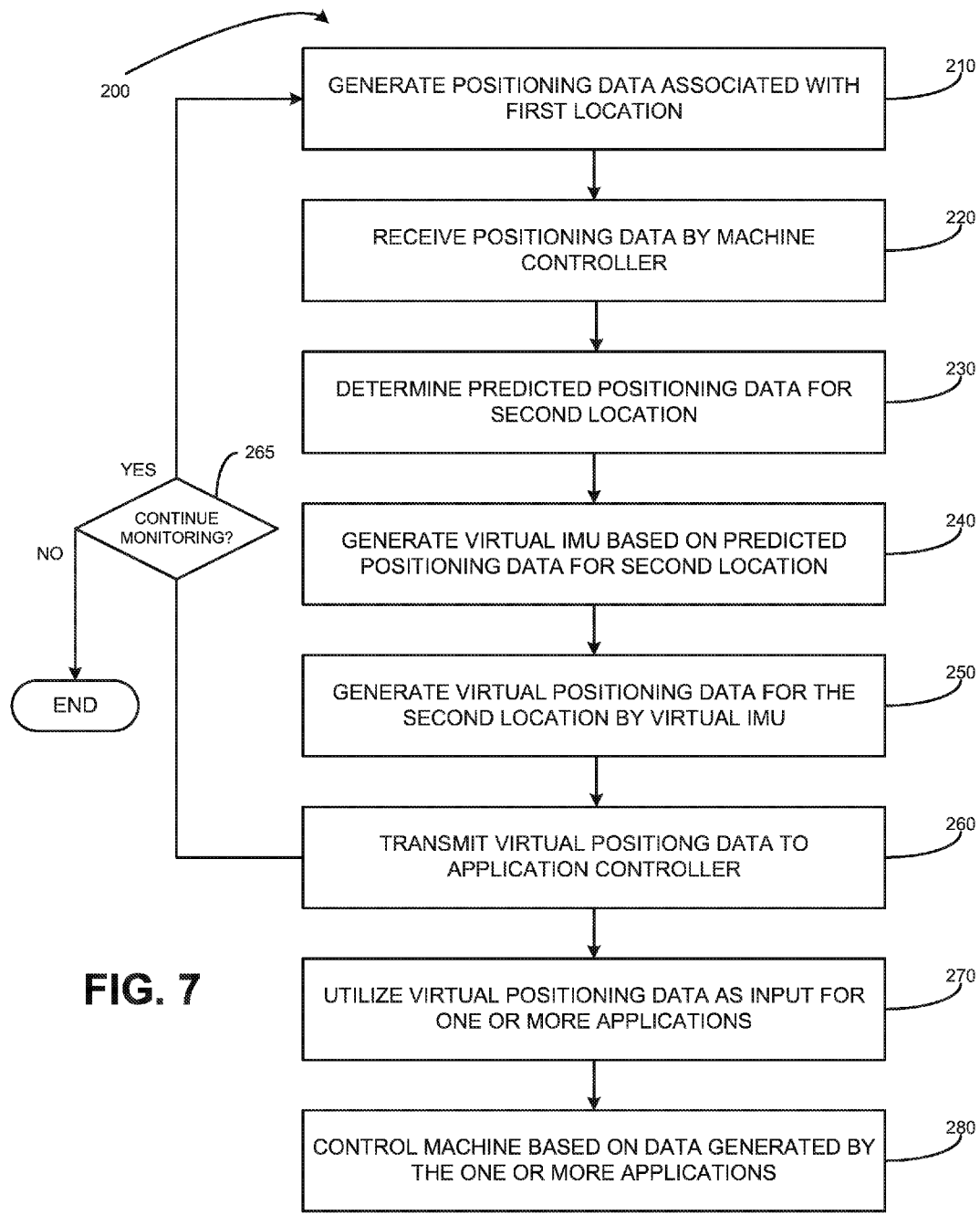

SYSTEMS AND METHODS FOR MONITORING POSITIONING OF A MACHINE BY UTILIZING A VIRTUAL IMU

TECHNICAL FIELD OF THE DISCLOSURE

The present disclosure generally relates to systems and methods for monitoring positioning of a machine and, more particularly, relates to systems and methods for monitoring positioning of a machine by utilizing information from an inertial measuring unit (IMU) at a first location to generate a virtual IMU at a second location.

BACKGROUND OF THE DISCLOSURE

Various machines, such as, but not limited to, trucks operating on worksites, often utilize positioning systems to track movement and/or positioning of the machines during machine operations. One or more sensors or position-tracking devices may be located on, or proximate to, the machine and may gather positioning data associated with the machine. Such data may be transmitted to a controller and the controller may then execute one or more applications for processing the data received from the sensors or position-tracking devices to generate positioning information associated with the machine.

Inertial measuring units (commonly abbreviated as "IMUs") are commonly used as position-tracking devices for machines. An IMU is, generally, an electronic device that measures positional characteristics (e.g., forces, speeds, angular rates, and the like) of an associated object (e.g., a machine) by utilizing a combination of one or more accelerometers, gyroscopes, magnetometers, and/or other sensors. IMUs are often used as important components for inertial navigation systems.

When used on a large machine (e.g., a truck, an articulated truck, and the like) an IMU may generate data associated with the specific location where it is placed on the machine. However, certain applications may prefer or require IMU data associated with other locations on the machine. To combat this issue, control systems for machines have utilized multiple IMUs at multiple locations on the machine to gather the required data for the applications. For example, systems and methods of U.S. Patent Publication No. 2014/0168009 ("Multi-IMU INS for Vehicle Control") utilize multiple IMUs in control systems to more accurately determine spatial relationships associated with a vehicle.

However, use of multiple IMUs, each at a different location and collecting data associated with each different location, may be cost prohibitive, as additional IMUs and associated devices are needed. Further, it may be difficult or even impossible to position an IMU on certain locations on machines in some situations, while the data at such locations is still desirable. Therefore, systems and methods for monitoring positioning of a machine, wherein a virtual IMU, virtually positioned at a different location from a physical IMU, can be determined based on data from the physical IMU, are desired.

SUMMARY OF THE DISCLOSURE

In accordance with one aspect of the present disclosure, a system for monitoring positioning of a machine is disclosed. The system may include an inertial measuring unit (IMU) located at a first location on the machine and configured to generate positioning data associated with the first location on the machine. The system may further include a machine controller operatively associated with the machine. The machine controller may be configured to receive the positioning data associated with the first location on the machine and determine predicted positioning data for a second location on the machine based on the positioning data associated with the first location of the machine. The machine controller may further be configured to generate a virtual IMU at the second location based on the predicted positioning data for the second location, wherein the virtual IMU generates virtual positioning data for the second location. The system may further include an application controller operatively associated with the machine controller and configured to use the virtual positioning data as input data for one or more machine-associated applications.

In accordance with another aspect of the disclosure, a truck is disclosed. The truck may include a frame assembly, including a front portion and a rear portion, and a plurality of axles supporting the frame assembly and including a front axle for supporting the front portion and a rear axle for supporting the rear portion. The truck may further include a plurality of ground engaging devices attached to the plurality of axles and an engine for generating torque to drive the plurality of ground engaging devices via the plurality of axles. The truck may further include an IMU located proximate to the front portion and configured to generate positioning data associated with the front portion. The truck may further include a truck controller operatively associated with the truck and configured to receive the positioning data associated with the front portion and determine predicted positioning data for the rear portion based on the positioning data associated with the front portion. The truck controller may be further configured to generate a virtual IMU associated with the rear portion based on the predicted positioning data for the rear portion, wherein the virtual IMU generates virtual positioning data for the rear portion. The truck controller may further be configured to transmit the virtual positioning data to an application controller operatively associated with the truck controller and configured to use the virtual positioning data as input data for one or more truck-associated applications.

In accordance with yet another aspect of the disclosure, a method for monitoring positioning of a vehicle is disclosed. The method may include generating, using an inertial measuring unit (IMU), positioning data associated with a first location on the vehicle, wherein the IMU is located at the first location on the vehicle. The method may further include receiving the positioning data associated with the first location by a machine controller, the machine controller being operatively associated with the vehicle, and determining, using the machine controller, predicted positioning data for a second location on the vehicle based on the positioning data associated with the first location on the vehicle. The method may further include generating, by the machine controller, a virtual IMU at the second location based on the predicted positioning data for the second location and generating, by the virtual IMU, virtual positioning data for the second location. The method may further include transmitting, by the machine controller, the virtual positioning data to an application controller, the application controller in operative association with the machine controller.

Other features and advantages of the disclosed systems and principles will become apparent from reading the following detailed disclosure in conjunction with the included drawing figures.

BRIEF DESCRIPTION OF THE DRAWINGS

FIG. 1 is a side view of an exemplary articulated truck, in accordance with an embodiment of the present disclosure.

FIG. 2 is a simplified top view of the exemplary articulated truck of FIG. 1, in accordance with the embodiment of FIG. 1 and the present disclosure.

FIG. 7 is a flowchart depicting an exemplary method for monitoring positioning of a machine, in accordance with another embodiment of the present disclosure.

Figure 3:
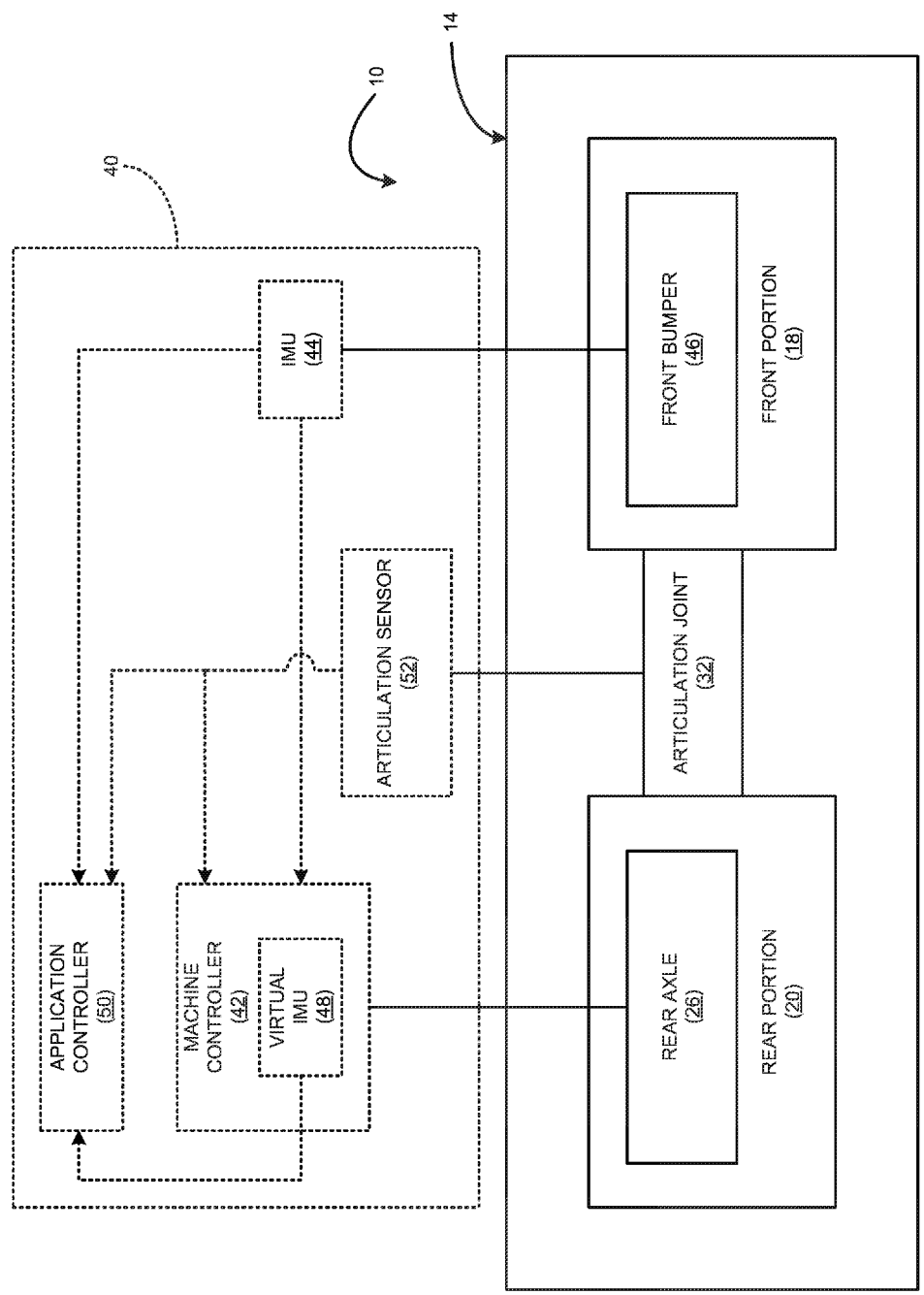
FIG. 3 is a schematic block diagram of an exemplary control system for monitoring positioning of the articulated truck of FIGS. 1 and 2, in accordance with an embodiment of the present disclosure.

While the following detailed description will be given with respect to certain illustrative embodiments, it should be understood that the drawings are not necessarily to scale and the disclosed embodiments are sometimes illustrated diagrammatically and in partial views. In addition, in certain instances, details which are not necessary for an understanding of the disclosed subject matter or which render other details too difficult to perceive may have been omitted. It should therefore be understood that this disclosure is not limited to the particular embodiments disclosed and illustrated herein, but rather to a fair reading of the entire disclosure and claims, as well as any equivalents thereto.

DETAILED DESCRIPTION OF THE DISCLOSURE

Turning now to the drawings and with specific reference to FIG. 1, a machine 10 is shown operating on a worksite 12. While the machine 10 is shown in FIG. 1 as an articulated truck 14, the systems and methods disclosed herein may be applicable to various other machines, such as, but not limited to earthmoving machines, trucks, mining trucks, wheel loaders, motor graders, tractors, excavators, and/or any other machine.

In the example shown in FIG. 1, the machine 10 includes a frame assembly 16. The frame assembly 16 may include a front portion 18 and a rear portion 20. A plurality of axles 22 may be provided as part of the machine 10 and may support the frame assembly 16. The plurality of axles 22 may include a front axle 24, operatively associated with the front portion 18, and at least one rear axle 26, which is operatively associated with the rear portion 20.

The machine 10 may further include a plurality of ground-engaging devices 28 associated with the plurality of axles 22 and configured to engage the ground to allow the machine 10 to traverse the worksite 12. The ground engaging-devices 28 may be propelled by torque provided to the ground engaging devices 28 by associated members of the plurality of axles 22. The torque may be generated by and provided to the axles 22 via a prime mover 30 (e.g., an engine, a battery, and the like). In some examples, torque generated by the prime mover 30 may be provided to the axles 22 via one or more transmissions, gear boxes, inter-axle differentials, drive shafts, couplings, or any combinations thereof (not shown). In addition, while the ground-engaging devices 28 are depicted as wheels in FIG. 1, it is to be understood that the ground-engaging devices 28 may also include continuous tracks and the like.

The front portion 18 and the rear portion 20 may be joined by an articulation joint 32, as shown in FIG. 1 and further exemplified in the overhead view of the machine 10 of FIG. 2. The articulation joint 32 allows for pivotable movement about the articulation joint 32 by both the front portion 18 and the rear portion 20 with respect to an articulation axis 34. The articulation axis 34 may be a point of reference from which an articulation angle 36 for the machine 10 may be measured. While the articulation angle 36 is shown as an angle of the position of the front portion 18's relative to the articulation axis 34, other angles of articulation at the articulation joint 32, measured from other reference axes and points, may be determined by various sensors and used for positioning calculation, as described more specifically below.

Various aspects and functions of the machine 10 may be monitored and/or controlled by a control system 40, elements thereof being denoted on FIGS. 1 and 2 by dotted lines and further detailed in the schematic depiction of the control system 40 of FIG. 3. The control system 40 may be utilized to monitor positioning of the machine 10 and for determining information associated with the machine. Furthermore, the control system 40 may be used for any machine monitoring or machine control purpose that is based on gathered positioning information.

The control system 40 may include a machine controller 42 which is operatively associated with the machine 10. The machine controller 42 may be any electronic controller or computing system including a processor which performs operations, executes control algorithms, stores data, retrieves data, gathers data, actuates actuators associated with the machine 10 and/or performs any other computing, controlling, or monitoring task desired. The machine controller 42 may be a single controller or may include more than one controller disposed to control various functions and/or features of the machine 10. Functionality of the machine controller 42 may be implemented in hardware and/or software and may rely on one or more data maps relating to the operation of the machine 10. To that end, the machine controller 42 may include internal memory and/or the machine controller 42 may be otherwise connected to external memory, such as a database or server. The internal memory and/or external memory may include, but are not limited to including, one or more of read only memory (ROM), random access memory (RAM), a portable memory, and the like. Such memory media are examples of nontransitory memory media. An example of such a computing device is described in greater detail below, with reference to the block diagram of FIG. 6.

To gather data for monitoring positioning of the machine 10, the machine controller 42 may be operatively associated with an inertial measuring unit (IMU) 44 of the control system 40, which may generate positioning data associated with the machine 10 and communicate said positioning data to the machine controller 42. The IMU 44 may be, generally, an electronic device that measures positional characteristics (e.g., forces, speeds, angular rates, and the like) of an associated object (e.g., the machine 10) by utilizing a combination of one or more accelerometers, gyroscopes, magnetometers, and/or other sensors. In the present example, the IMU 44 is located at a first position 45, which is physically positioned relative to a front bumper 46 of the machine 10, but of course other locations are possible. The front bumper 46 may be affixed to, or otherwise disposed proximate to, the front portion 18. The IMU 44 may be affixed to, embedded within, or otherwise connected to the front bumper 46. Therefore, the positioning data generated by the IMU 44 may be associated with the front bumper 46 and/or, more generally, the front portion 18. While the IMU 44 is shown in the present example at the front bumper 46 and/or, more generally, the front portion 18 at which the IMU 44 is located, may be any other location on the machine 10 at which a user desires to gather positioning data.

However, for use with certain applications and/or for calculating certain positioning-related metrics, data generated by the IMU 44 at the front bumper 46 or, more generally, the front portion 18 may be either insufficient or may not provide the locational accuracy needed for the specific positioning-related metrics. For example, in certain scenarios, positioning data may be needed from a second position 47 on the machine 10, other than the first position 45 at the front bumper 46. To determine positioning information associated with a second position 47 on the machine 10, the machine controller 42 may generate a virtual IMU 48 at the second position 47.

The virtual IMU 48 may be a virtual approximation of an IMU at the second position 47 on the machine 10. As such, the virtual IMU 48 may generate virtual positioning data at the second position 47. Generation of the virtual IMU 48 may be performed by the machine controller 42. The machine controller 42 may receive the positioning data associated with the first position 45 from the IMU 44 and determine predicted positioning data for the second position 47 on the machine 10, for virtual placement of the virtual IMU 48, based on the positioning data associated with the first position 45. The machine controller 42 may then generate the virtual IMU 48 at the second position 47 based on the predicted positioning data for the second position 47. In the example embodiment of FIGS. 1-3, the virtual IMU 48 is shown virtually disposed at the second position 47, wherein the second position 47 is proximate to the rear axle 26 and, more generally, proximate to the rear portion 20. However, the second position 47, at which the virtual IMU 48 is positioned, may be any other position on the machine 10, wherefrom virtual positioning data is desired and such virtual positioning data can be derived based on positioning data generated by the IMU 44.

Positioning data associated with the first position 45 may be transformed to generate data for the virtual IMU 48 at the second position 47 based on any suitable equation or algorithm for data transformation. For example, as illustrated in the simplified overhead view of FIG. 4, using acceleration data at the first position 45 (denoted as the vector $A_{45R}$) generated by the IMU 44, virtual acceleration data at the second position 47 (denoted as the vector $A_{47R}$) can be determined.

Figure 4:
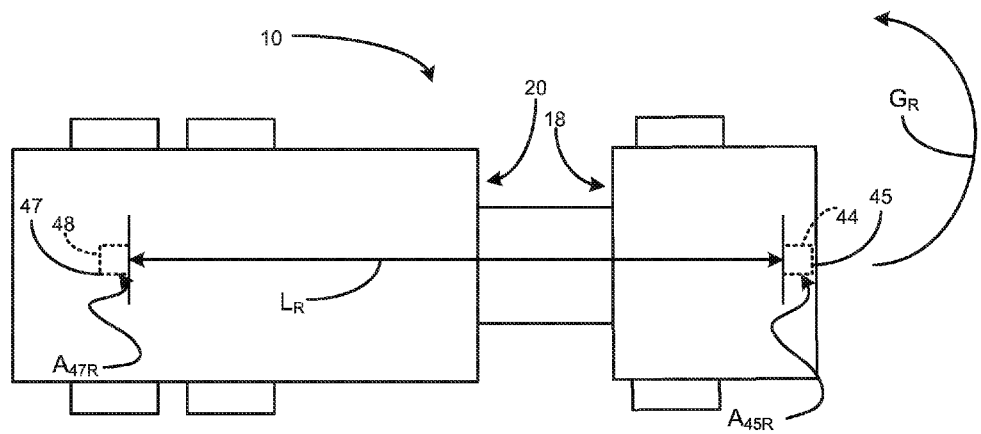
FIG. 4 is a simplified top view of the articulated truck of FIGS. 1-2, detailing positioning metrics for analysis and generation of a virtual IMU when the articulated truck is not articulated, in accordance with an embodiment of the present disclosure.

In the example of FIG. 4, the machine 10 is not articulated and, thusly, the machine 10 may turn as a rigid body. The IMU 44 may determine both $A_{45R}$ and a three-dimensional (3-D) gyro rate of turn (denoted as the vector $G_R$). Because the machine 10 is not articulated in the example of FIG. 4 and acts as a rigid body, the 3-D gyro rate of turn at the second position 47 will be substantially similar to, or equal to, $G_R$. Further, because the machine 10 in the present example is acting as a rigid body, the lever arm between the first position 45 and the second position 47 associated with the torque of the turning of the machine 10 (denoted as the vector $L_R$) may remain constant. Using the aforementioned 3-D vectors, the virtual IMU 48 may output the virtual acceleration data $A_{47R}$ based on the following transform:

$$A_{47R}=A_{45R}+[G_R \times L_R],$$

wherein "x" denotes a 3-D vector cross-product operation.

Figure 5:
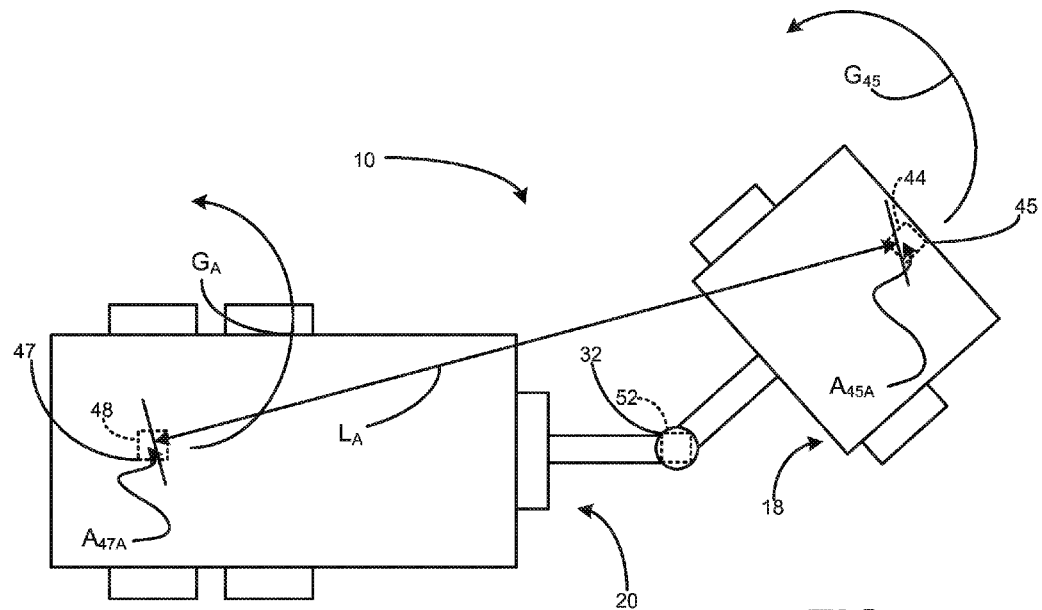
FIG. 5 is a simplified top view of the articulated truck of FIGS. 1-2, detailing positioning metrics for analysis and generation of a virtual IMU when the articulated truck is articulated, in accordance with an embodiment of the present disclosure.

Furthermore, in another example as illustrated in FIG. 5 wherein the machine 10 is articulated, using acceleration data (denoted as the vector $A_{45A}$) generated by the IMU 44, virtual acceleration data at the second position 47 (denoted as the vector $A_{47A}$) can be determined. Calculations for an articulating machine 10 will differ from those of the non-articulated version of the machine 10, shown in FIG. 4, because the 3-D gyro rate of turn at the second position 47 ($G_A$) and lever arm ($L_A$) may change based on the articulation of the machine 10.

To determine $A_{47A}$ in the present example, the 3-D gyro rate of turn for the rear portion 20, specifically at the second position 47 and denoted as the vector $G_A$, is first determined. $G_A$ may be determined according to the following transformation equation:

$$G_A=G_{45}+dG,$$

wherein $G_{45}$ is a vector representing the 3-D gyro rate of turn for the front portion 18, more specifically at the first position 45 and determined by the IMU 44, and dG is the relative 3-D rate of the articulation between the front portion 18 and the rear portion 20. dG may be determined by using, for example, an articulation sensor 52 that measures the articulation between the front portion 18 and the rear portion 20 and provides said information to the machine controller 42, as shown in the schematic depiction of FIG. 3. In such examples, the articulation sensor 52 may measure one or more articulation angles (e.g., the articulation angle 36) and/or measure the change in articulation angles over time. Alternatively, dG may be derived from other information provided by the IMU 44 and/or any other sensors associated with the machine 10.

With $G_A$ determined, $A_{47A}$ can be determined based on $G_A$ and the lever arm vector $L_A$, which is measured or determined as the lever arm between the first position 45 and the second position 47. As such, the determination of $A_{47A}$ may be represented in the following equation:

$$A_{47A}=A_{45A}+[G_A \times L_A],$$

wherein "x" denotes a 3-D vector cross product operation and $G_A$ is determined in accordance with the above equation for determining $G_A$, which incorporates the relative rate of articulation between the front portion 18 and rear portion 20 (dG).

The above described equations for transforming the acceleration data are merely exemplary methods for determining predicted positioning data for the virtual IMU 48 and the systems and methods disclosed herein are certainly not limited to determining the virtual positioning data described in relation to FIGS. 4-5. Additionally or alternatively, the virtual IMU 48 may produce virtual positioning data associated with any other accelerations, speeds, real-time positioning, pitch, roll, yaw, or any other desired positioning data at the second position 47, based, ultimately, on positioning data associated with the first position 45 and generated by the IMU 44.

The virtual positioning data provided by and/or generated at the virtual IMU 48 may then be used by an application controller 50, which is operatively associated with the machine controller 42. The application controller 50 may be configured to use the virtual positioning data for any application associated with the machine 10 that desires and/or requires positioning information at, or proximate to, the second position 47.

Similar to the machine controller 42, the application controller 50 may be any electronic controller or computing system including a processor which performs operations, executes control algorithms, stores data, retrieves data, gathers data, actuates actuators associated with the machine 10 and/or performs any other computing, controlling, or monitoring task desired. While shown as two separate controllers, the machine controller 42 and the application controller 50 may, alternatively, be embodied by one singular computing device.

Figure 6:
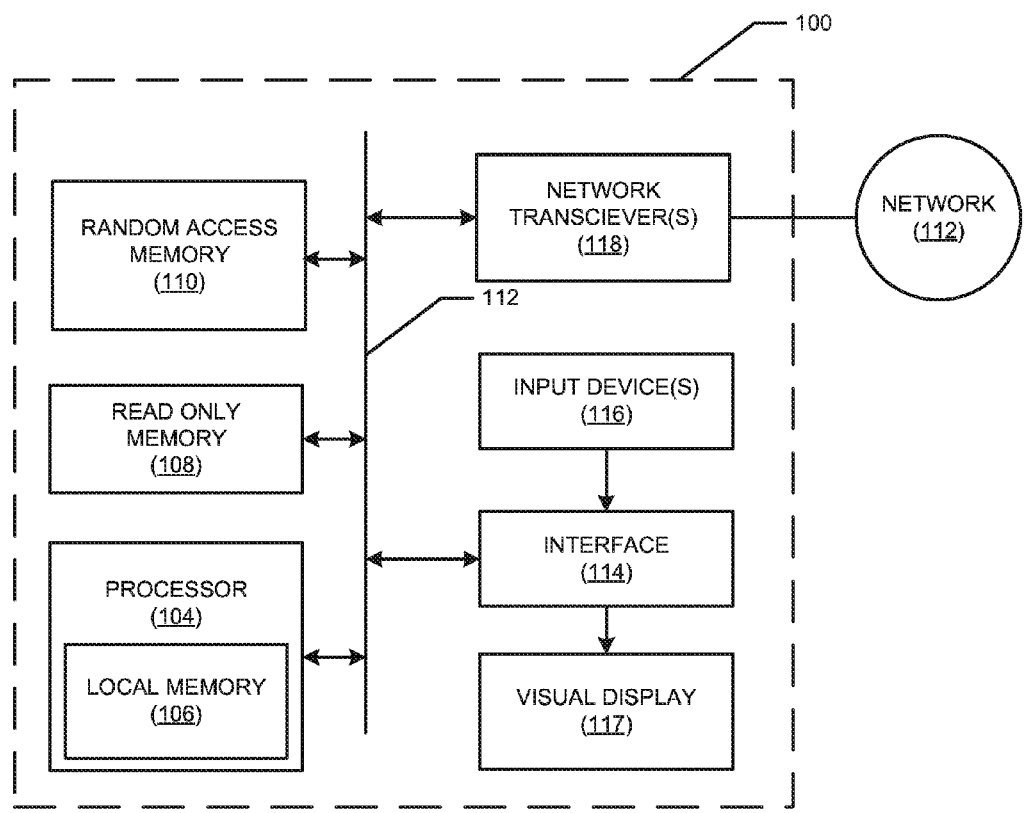
FIG. 6 is a schematic block diagram showing components of a computing device, which may be utilized to realize various computer-based components of FIGS. 1-3, in accordance with the present disclosure.

An additional, exemplary combination of hardware and software which may be used to implement one or both of the machine controller 42 and the application controller 50 is depicted schematically in FIG. 6. FIG. 6 is a block diagram of example components of a computing device 100, which is capable of executing instructions to realize elements of the disclosed systems and controllers described above in FIGS. 1-3. Further the computing device 100 may be capable of executing instructions to perform the methods discussed below in reference to FIG. 7. The computing device 100 may be, for example but not limited to, an on-board computer, a mobile device, a tablet computer, a cellular phone, a laptop computer, a server, a personal computer, or any other type of computing device. The computing device 100 of the instant example includes a processor 104. For example, the processor 104 may be implemented by one or more microprocessors or controllers from any desired family or manufacturer.

The processor 104 includes a local memory 106 and is in communication with a main memory including a read only memory 108 and a random access memory 110 via a bus 112. The random access memory 110 may be implemented by Synchronous Dynamic Random Access Memory (SDRAM), Dynamic Random Access Memory (DRAM), RAMBUS Dynamic Random Access Memory (RDRAM) and/or any other type of random access memory device. The read only memory 108 may be implemented by a hard drive, flash memory and/or any other desired type of memory device.

The computing device 100 may also include an interface circuit 114. The interface circuit 114 may be implemented by any type of interface standard, such as, for example, an Ethernet interface, a universal serial bus (USB), and/or a PCI express interface. One or more input devices 116 are connected to the interface circuit 114. The input device(s) 116 permit a user to enter data and commands into the processor 104. The input device(s) 116 can be implemented by, for example, a keyboard, a mouse, a touchscreen, a track-pad, a trackball, and/or a voice recognition system. For example, the input device(s) 116 may include any wired or wireless device for providing data to the computing device 100, such as the IMU 44.

The visual display 117 is also connected to the interface circuit 114. The visual display 117 can be implemented by, for example, display devices for associated data (e.g., a liquid crystal display, a cathode ray tube display (CRT), etc.).

Further, the computing device 100 may include one or more network transceivers 118 for connecting to a network, such as the network 80, the Internet, a WLAN, a LAN, a personal network, or any other network for connecting the computing device 100 to one or more other computers or network capable devices. As such, the computing device 100 may be embodied by a plurality of computing devices 100.

As mentioned above the computing device 100 may be used to execute machine readable instructions. For example, the computing device 100 may execute machine readable instructions to perform one or more steps of the method shown in the block diagram of FIG. 7, which is described in more detail below. In such examples, the machine readable instructions comprise a program for execution by a processor such as the processor 104 shown in the example computing device 100. The program may be embodied in software stored on a tangible computer readable medium such as a CD-ROM, a floppy disk, a hard drive, a digital versatile disk (DVD), a Blu-ray disk, or a memory associated with the processor 104, but the entire program and/or parts thereof could alternatively be executed by a device other than the processor 104 and/or embodied in firmware or dedicated hardware.

INDUSTRIAL APPLICABILITY

In general, the present disclosure may find applicability in many industries, including, but not limited to, systems and methods for monitoring positioning of a machine. Further, the disclosed systems and methods, more particularly, are applicable for monitoring positioning of a machine by utilizing information from an inertial measuring unit (IMU) at a first location to generate a virtual IMU at a second location. Such systems and methods may be applicable to monitoring positions related to various machines, such as, but not limited to trucks, articulated trucks, earthmoving machines, mining trucks, wheel loaders, motor graders, tractors, excavators, and/or any other vehicle.

Turning now to FIG. 7, a method 200 for monitoring positioning of the machine 10 is shown as a flowchart. The method 200 may begin by generating positioning data, by the IMU 44, at the first position 45 on the machine 10, wherein the IMU 44 is located generally proximate to the first position 45, as shown in block 210. The positioning data associated with the first position 45 may be received by the machine controller 42, as shown in block 220. The machine controller 42 may be operatively associated with the machine 10.

The machine controller 42 may determine predicted positioning data for the second position 47 on the machine 10 based on the positioning data associated with the first position 45, as shown in block 230. The predicted positioning data for the second position 47 may then be used by the machine controller 42 to generate the virtual IMU 48 at the second position 47, as shown in block 240. The virtual IMU 48 may be used to generate virtual positioning data for the second position 47, as shown in block 250.

By generating virtual positioning data and utilizing the virtual IMU 48, positioning data at the second position 47 may be particularly useful for generating positioning data without the need for a second, physical IMU at the second position 47. Reducing the need for additional IMUs at, for example, locations such as the second location may reduce cost of position monitoring systems. Furthermore, the virtual IMU 48 may be located at positions on the machine 10 which may be difficult, or even impossible, to mount a physical IMU and, therefore, data that was uncollectable prior to the use of the virtual IMU 48 may now be collectable.

Returning to the method 200, the machine controller 42 may transmit the virtual positioning data, generated by the virtual IMU 48, to the application controller 50, as shown in block 260. Upon transmission of the virtual positioning data, the method 200 may return to block 210 if monitoring is to continue, otherwise the method 200 may end, as depicted in decision block 265.

At the application controller 50, the virtual positioning data may then be utilized by one or more applications, as shown in block 270. By generating the virtual positioning data at the second position 47 using the virtual IMU 48, the applications which use virtual IMU 48 data may not require additional coding or algorithms for converting data, which may result in greater computational efficiency at the application controller 50. Lastly, the data generated by applications at the application controller 50 may be used downstream for controlling the machine 10, as shown in block 280.

It will be appreciated that the present disclosure provides and systems and methods for monitoring positioning of a machine by utilizing information from an IMU at a first location to generate a virtual IMU at a second location. While only certain embodiments have been set forth, alternatives and modifications will be apparent from the above description to those skilled in the art. These and other alternatives are considered equivalents and within the spirit and scope of this disclosure and the appended claims.

What is claimed is:

1. A system for monitoring positioning of a machine, the system comprising:
   an inertial measuring unit (IMU) located at a first location on the machine and configured to generate positioning data associated with the first location on the machine;
   a electronic machine controller operatively associated with the machine and configured to:
      receive the positioning data associated with the first location on the machine;
      determine predicted positioning data for a second location on the machine based on the positioning data associated with the first location on the machine; and
      generate a virtual IMU at the second location based on the predicted positioning data for the second location, the virtual IMU generating virtual positioning data for the second location; and
   an electronic application controller operatively associated with the machine controller and configured to use the virtual positioning data as input data for one or more machine-associated applications.

2. The system of claim 1, wherein the application controller is further configured to use the positioning data associated with the first location on the machine generated by the IMU as the input data, in addition to using the virtual positioning data.

3. The system of claim 1, wherein determining the predicted positioning data for the second location by the machine controller includes transforming the positioning data associated with the first location based on a three-dimensional (3-D) gyro rate of turn at the first location, wherein the three dimensional gyro rate of turn at the first location is determined using the IMU.

4. The system of claim 1, wherein the first location on the machine is a front location on the machine, wherein the second location on the machine is a rear location on the machine, and wherein generating a virtual IMU at the second location based on the predicted positioning data for the second location includes generating the virtual IMU as being virtually positioned at the rear location on the machine.

5. The system of claim 4, wherein the machine is a truck including a front portion and a rear portion, wherein the front location on the machine is on the truck and associated with the front portion, and wherein the rear location is on the truck and associated with the rear portion of the truck.

6. The system of claim 5, wherein the front portion of the truck includes a front bumper, and wherein the front location is further associated with the front bumper.

7. The system of claim 5, wherein the rear portion of the truck includes a rear axle, and wherein the rear location is further associated with the rear axle.

8. The system of claim 5, wherein the truck further includes an articulation joint connecting the front portion to the rear portion and configured to allow pivotal movement about the articulation joint by the front portion and the rear portion.

9. The system of claim 5, wherein the machine controller is further configured to receive articulation information from an articulation sensor associated with the articulation joint, and wherein determining the predicted positioning data for the second location by the machine controller is further based on the articulation information.

10. The system of claim 9, wherein determining the predicted positioning data for the second location by the machine controller includes transforming the positioning data associated with the first location based on a three-dimensional (3-D) gyro rate of turn at the first location and articulation information associated with the front portion and the rear portion, wherein the three dimensional gyro rate of turn at the first location is determined using the IMU.

11. A truck comprising:
   a frame assembly including a front portion and a rear portion;
   a plurality of axles supporting the frame assembly and including a front axle for supporting the front portion and a rear axle for supporting the rear portion;
   a plurality of ground engaging devices attached to the plurality of axles;
   an engine for generating torque to drive the plurality of ground engaging devices via the plurality of axles;
   an inertial measuring unit (IMU) located proximate to the front portion and configured to generate positioning data associated with the front portion; and
   a truck controller operatively associated with the truck and configured to:
      receive the positioning data associated with the front portion;
      determine predicted positioning data for the rear portion based on the positioning data associated with the front portion;
      generate a virtual IMU associated with the rear portion based on the predicted positioning data for the rear portion, the virtual IMU generating virtual positioning data for the rear portion; and
      transmit the virtual positioning data to an application controller operatively associated with the truck controller and configured to use the virtual positioning data as input data for one or more truck-associated applications.

12. The truck of claim 11, further comprising an articulation joint connecting the front portion and the rear portion and configured to allow pivotal movement about the joint by the front portion and the rear portion.

13. The truck of claim 12, further comprising an articulation sensor associated with the articulation joint, and wherein the truck controller is further configured to receive articulation information from the articulation sensor, and wherein determining the predicted positioning data for the rear portion by the truck controller is further based on the articulation information.

14. The truck of claim 11, further comprising a front bumper associated with the front portion, and wherein the IMU is located proximate to the front bumper and generates the positioning data based on positioning of the front bumper.

15. The truck of claim 11, wherein the virtual IMU is further associated with the rear axle and virtual positioning of the virtual IMU is proximate to the rear axle.

16. A method for monitoring positioning of a vehicle, the method comprising:
- generating, using an inertial measuring unit (IMU), positioning data associated with a first location on the vehicle, the IMU being located at the first location on the vehicle;
- receiving the positioning data associated with the first location by a machine controller, the machine controller being operatively associated with the vehicle;
- determining, using the machine controller, predicted positioning data for a second location on the vehicle based on the positioning data associated with the first location on the vehicle;
- generating, by the machine controller, a virtual IMU at the second location based on the predicted positioning data for the second location;
- generating, by the virtual IMU, virtual positioning data for the second location; and
- transmitting, by the machine controller, the virtual positioning data to an application controller, the application controller in operative association with the machine controller.

17. The method of claim 16, further comprising utilizing, by the application controller, the virtual positioning data as input data for one or more vehicle-associated applications.

18. The method of claim 17, further comprising controlling the vehicle based on, at least, data generated by the one or more vehicle-associated applications.

19. The method of claim 16, wherein the generating positioning data associated with the first location on the vehicle includes generating positioning data based on the position of a front portion of the truck, and wherein generating the virtual IMU at the second location includes generating the virtual IMU at a virtual second location which is, virtually, associated with a rear portion of the truck.

20. The method of claim 19, further comprising receiving, by the machine controller, articulation information from an articulation sensor associated with an articulation joint of the truck, the articulation joint disposed between the rear portion and the front portion and configured to allow pivotal movement about the articulation joint by the front portion and the rear portion, and wherein determining the predicted positioning data for the second location by the machine controller is further based on the articulation information.

* * * * *